United States Patent [19]

Sabatino et al.

[11] Patent Number: 4,497,604

[45] Date of Patent: Feb. 5, 1985

[54] APPARATUS AND METHOD FOR SUPPLYING ELECTRODE PLATES IN THE ASSEMBLY OF BATTERY CELL ELEMENTS

[75] Inventors: Anthony Sabatino, St. Paul, Minn.; Daniel Orlando, New Berlin, Wis.; Douglas J. Olszewski, Inver Grove Heights, Minn.

[73] Assignee: GNB Batteries Inc., Mendota Heights, Minn.

[21] Appl. No.: 406,645

[22] Filed: Aug. 9, 1982

[51] Int. Cl.³ .................................... H01M 10/14
[52] U.S. Cl. .................................... 414/131; 29/730; 29/738; 198/740; 221/93; 414/42; 414/750; 414/786
[58] Field of Search ............... 414/32, 41, 42, 125, 414/126, 131, 750, 786; 198/421, 740, 741; 29/623.1, 730, 738; 221/93, 264

[56] References Cited

U.S. PATENT DOCUMENTS

| | | | |
|---|---|---|---|
| 2,337,033 | 12/1943 | Davies | 221/93 |
| 2,639,824 | 5/1953 | Shannon et al. | 221/264 X |
| 2,672,837 | 3/1954 | Maher | 198/740 X |
| 2,897,950 | 8/1959 | Reed | 29/730 X |
| 3,101,156 | 8/1963 | Carson et al. | 414/131 X |
| 3,443,706 | 5/1969 | Puhm | 414/41 X |
| 3,963,456 | 6/1976 | Tsuchiya et al. | 221/264 X |
| 4,073,373 | 2/1978 | Crowley et al. | 198/421 |
| 4,314,403 | 2/1982 | Sanekata | 29/730 |
| 4,351,106 | 9/1982 | Brady | 29/730 |
| 4,381,596 | 5/1983 | Simonton et al. | 414/41 X |

FOREIGN PATENT DOCUMENTS

| | | | |
|---|---|---|---|
| 1327417 | 4/1963 | France | 221/264 |
| 1565928 | 4/1980 | United Kingdom | 29/730 |

Primary Examiner—Leslie J. Paperner
Attorney, Agent, or Firm—Augustus J. Hipp; Dennis R. Schlemmer

[57] ABSTRACT

An apparatus and method for supplying electrode plates in the assembly of battery cell elements. The apparatus includes a shuttle feed device for containing a plurality of stacks of electrode plates of common polarity and successively dispensing a single plate from each stack, a walking beam transfer device for successively receiving plates from said shuttle device and moving the plates into a row with the plates commonly oriented and in predetermined spaced relation, and a plate loader for simultaneously engaging and removing from said walking beam transfer device the number of plates of common polarity required in the assembly of a battery cell element. The feeding device is adapted for easy plate loading, and in conjunction with the transfer device, is adapted to provide a reliable supply of electrode plates for use in the automated assembly of cell elements.

27 Claims, 13 Drawing Figures

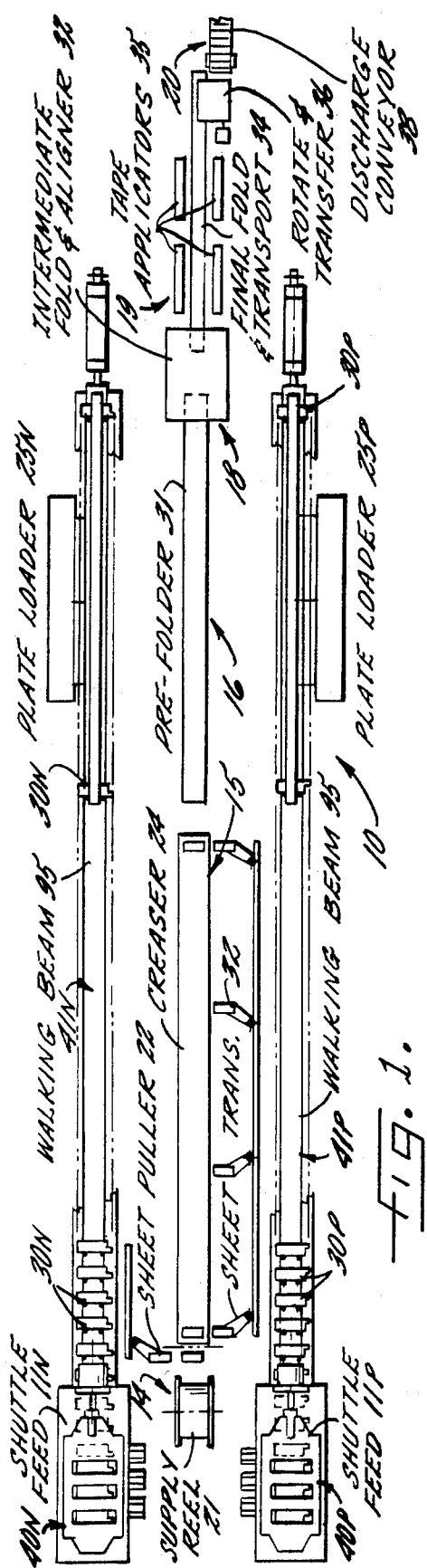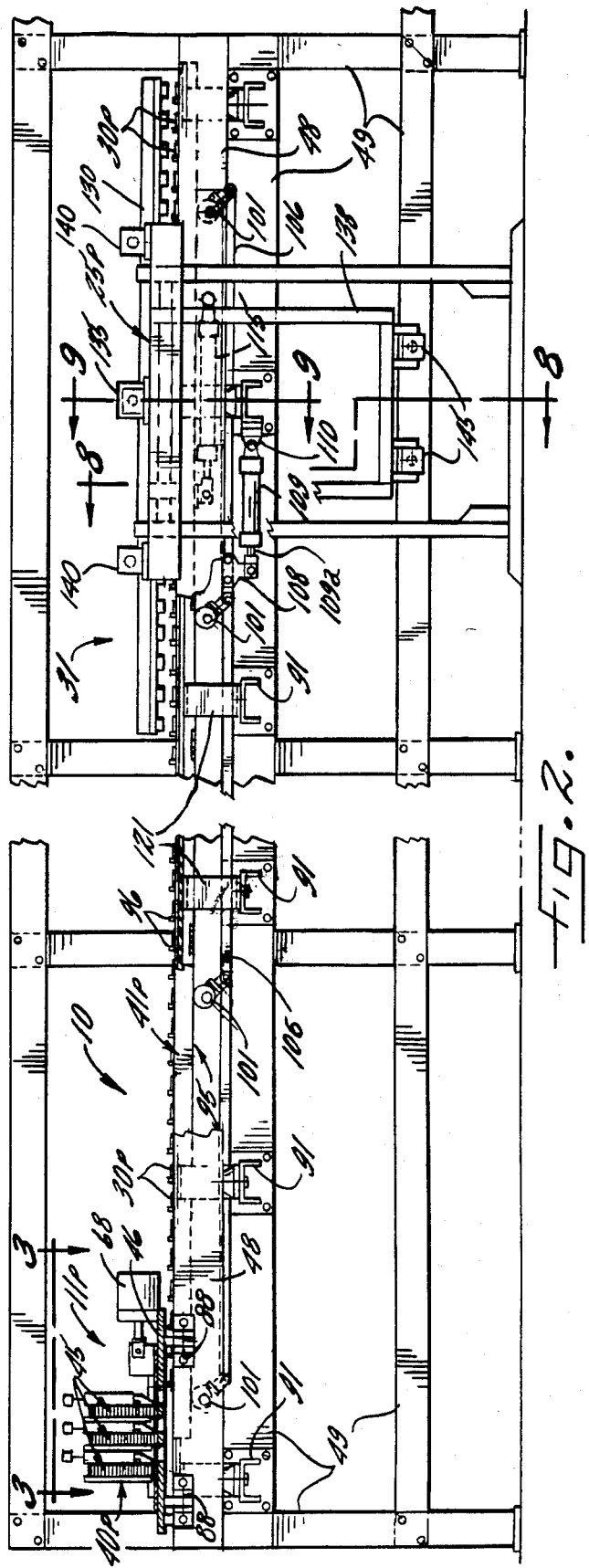

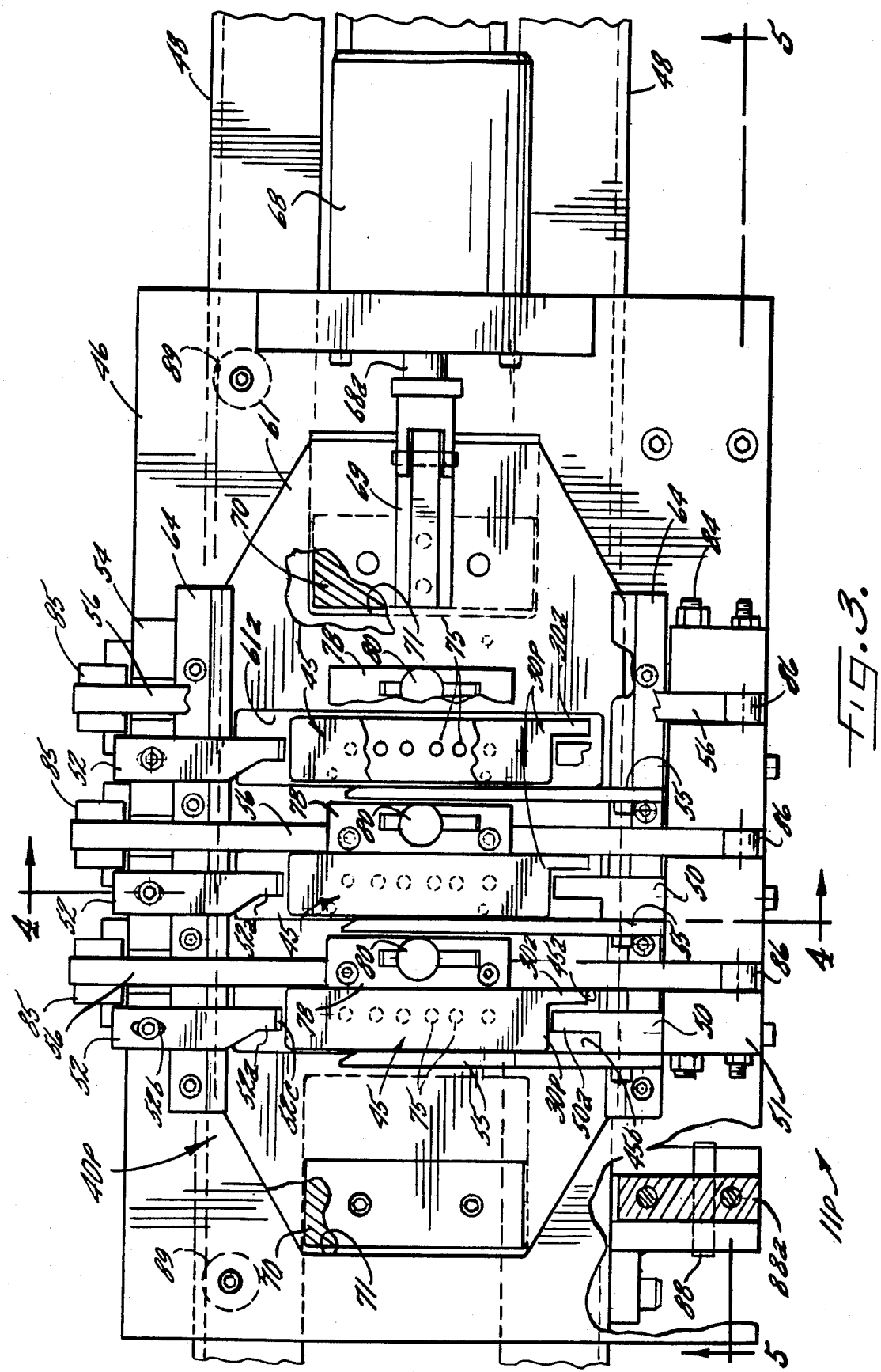

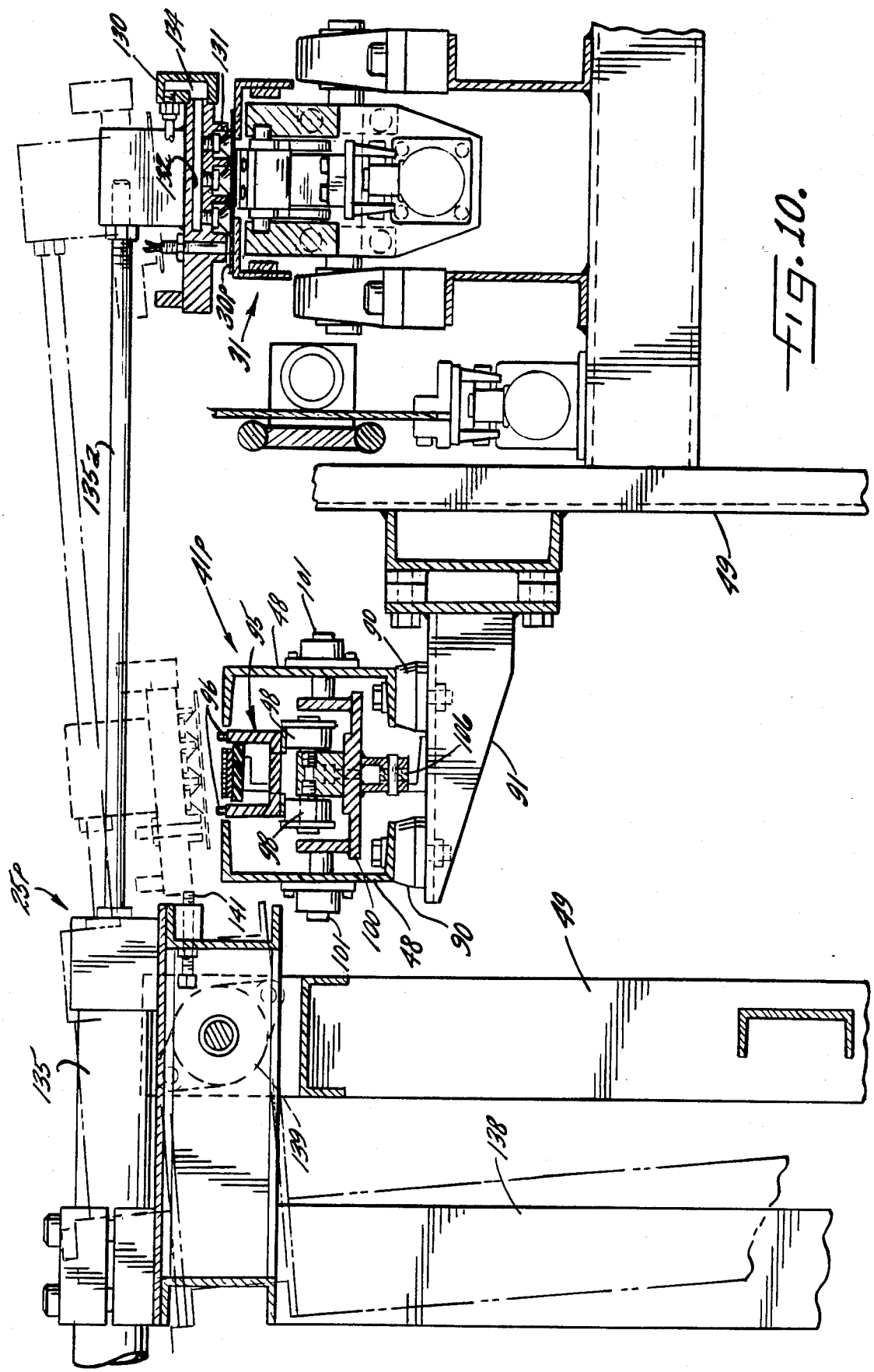

4,497,604

APPARATUS AND METHOD FOR SUPPLYING ELECTRODE PLATES IN THE ASSEMBLY OF BATTERY CELL ELEMENTS

RELATED APPLICATIONS

Sabatino et al, U.S. Ser. No. 381,227, filed May 24, 1982, for: Apparatus and Method for Assembling Battery Cell Elements.

Klang and Rao, U.S. Ser. No. 499,425 filed June 6, 1983 for: Lead-Acid Battery and Method of Making Same; a continuation of U.S. Ser. No. 352,294 filed Feb. 26, 1982; which in turn is a continuation-in-part of U.S. Ser. No. 245,772, filed Mar. 20, 1981.

Oswald and Lund, U.S. Ser. No. 245,795, filed Mar. 20, 1981, for: A Lead-Acid Battery Element Stack and Method of Making Same; now U.S. Pat. No. 4,406,057, issued Sept. 27, 1983.

DESCRIPTION OF THE INVENTION

The present invention relates generally to the assembly of cell elements for lead-acid storage batteries, and more particularly, to an improved apparatus and method for supplying electrode plates for use in the automated assembly of such cell elements.

Sabatino et al application Ser. No. 381,227, assigned to the same assignee as the present application, discloses an apparatus and method for the high volume assembly of battery cell elements of the type that comprise a relatively large number of electrode plates, ranging in number up to about 72 plates per cell or perhaps more, separated by a continuous accordion folded insulator sheet. By reason of the large number of electrode plates required in the production of such cell elements, it is desirable to have a continuous and reliable supply of such plates supplied to the element assembly apparatus. Interruptions in plate supply, either by the failure or inability of an operator to adequately load the apparatus with plates or by the malfunction of the plate feed or loading apparatus, can result in costly shutdowns in production. Moreover, cell elements assembled with lesser or greater than the proper number of electrode plates as a result of such supply problems can create significant production waste.

It is an object of the present invention to provide an improved apparatus and method for supplying and feeding electrode plates in the automated assembly of battery cell elements.

Another object is to provide an apparatus and method as characterized above that is adapted to reliably supply positive and negative electrode plates in proper orientation and spaced relationship for use in element assembly.

A further object is to provide an apparatus of the above kind that permits an operator, while located at a single station, to readily load the apparatus with both positive and negative electrode plates for use in the element assembly. A related object is to provide such an apparatus in which the operator need only load a relatively few plate supply chambers or the like which dispense the plate by a manner that permits their use in the assembly of battery cell elements having a relatively large number of plates.

Still another object is to provide an apparatus and method of the foregoing type which permits easy detection and correction of interruptions or malfunctions in the supply of the electrode plates, often without requiring any interruption in the element assembly operation.

Other objects and advantages of the invention will become apparent upon reading the following detailed description and upon reference to the drawings, in which:

FIG. 1 is a diagrammatic layout of a battery cell element assembly apparatus having an electrode plate supply apparatus embodying the present invention;

FIG. 2 is an enlarged side elevational view of the plate supply apparatus shown in FIG. 1;

FIG. 3 is an enlarged top view of the shuttle feed device of the illustrated plate supply apparatus, taken in the plane of line 3—3 in FIG. 2;

FIG. 5 is a side elevational view, partially in section, taken in the plane of line 5—5 in FIG. 3;

FIG. 6 is an enlarged fragmentary vertical section showing the dispensing of plates from the shuttle feed device to the walking beam transfer device of the illustrated apparatus;

FIG. 10 is an enlarged vertical section showing the plate loader positioning plates received from the walking beam transfer device onto a pre-fold mechanism of the illustrated element assembly apparatus.

Figure 4:
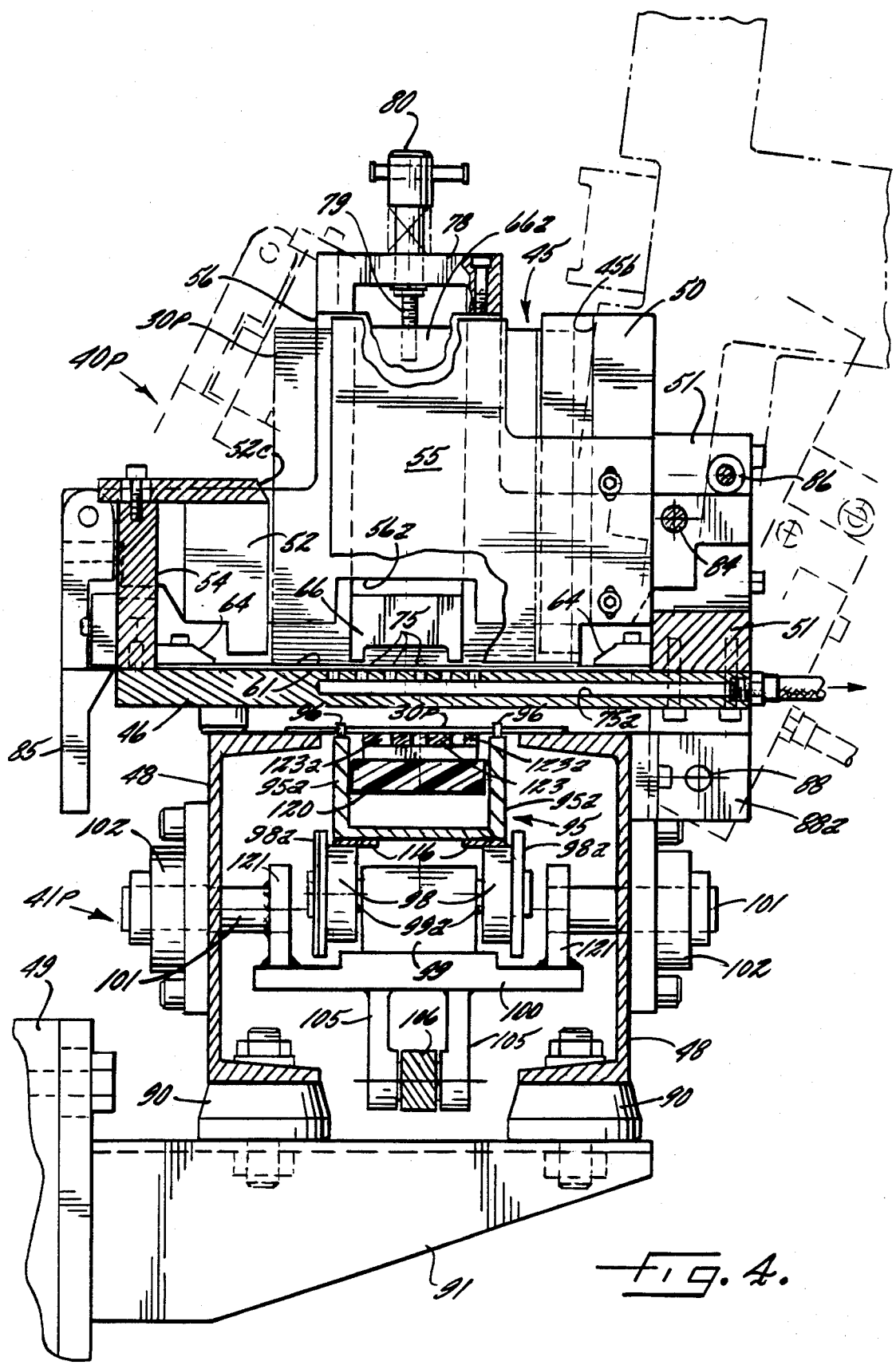
FIG. 4 is a vertical section taken in the plane of line 4—4 in FIG. 3.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention. Thus, while the present invention will be described in conjunction with an apparatus for assembling battery cell elements of the type disclosed in the aforesaid Sabatino et al application, it will be appreciated that the invention is applicable to other methods and means for assembling battery cell elements.

Referring now to FIG. 1, there is shown a diagrammatic layout of an illustrative element assembly apparatus 10 having electrode plate supply apparatus 11P, 11N embodying the present invention. The illustrated element assembly apparatus 10 basically includes a separator sheet supply station 14, a separator sheet creaser and cutter station 15, a plate load and element pre-fold station 16, an element intermediate fold station 18, a final fold and tape applicator station 19, and a completed element discharge station 20. The element assembly apparatus 10 may be of the type described in the aforesaid Sabatino et al application Ser. No. 381,227 and the disclosure of that application is incorporated herein by reference.

In operation of such element assembly apparatus 10, a continuous length of an insulating separator sheet is drawn from a supply station reel 21 by a sheet puller 22 and positioned into a creaser 24 at the succeeding station 15. Upon positioning of the separator sheet into the creaser 24, the sheet is creased at longitudinally spaced fold points and cut to a determined length. A first plate loader 25P at the succeeding plate load and pre-fold station 16 simultaneously positions a first set of electrode plates 30P of common polarity onto a pre-fold mechanism 31, after which a sheet transfer mechanism 32 transfers the cut and creased separator sheet from the creaser 24 into position over the first set of plates 30P on the pre-fold mechanism 31 and a second plate loader 25N places a second set of electrode plates 30N of opposite polarity onto the separator sheet. The pre-fold mechanism 31 thereupon loosely folds the plates with the separator sheet appropriately interleaved to a first predetermined length. An intermediate fold mechanism 30 at the next station 18 then engages the pre-folded element assembly, positions the plates thereof into predetermined alignment, and compresses the assembly to an intermediate or shorter length. A final fold mechanism 34 at the succeeding station 19 then engages the intermediate folded element assembly, compresses the assembly to final size, and transports it past a series of tape applicators 35 where tape is applied about the element to secure it in assembled form. A transfer device 36 at the discharge station 20 receives the assembled element and transfers it onto a discharge conveyor 38. While the element assembly apparatus 10 of the foregoing type is susceptible for high volume automated production of battery cell elements, the operating efficiency of such apparatus, as indicated above, can be dependent upon the reliable supply of electrode plates.

In accordance with the invention, the plate supply apparatus is adapted to reliably dispense properly oriented and spaced electrode plates from respective positive and negative plate supply chambers and present such plates in rows for engagement and utilization by the element assembly apparatus. To this end, the plate supply apparatus 11P for plates of positive polarity is located essentially on one side of the element assembly apparatus 10 and the plate supply apparatus 11N for plates of the opposite polarity is located on the opposite side of the assembly apparatus. Each plate supply apparatus 11P, 11N includes a respective shuttle feed device 40P, 40N for receiving stacks of electrode plates 30P, 30N of common polarity and for successively dispensing a plurality of the plates onto a respective walking beam transfer device 41P, 41N which transfers the plates in properly oriented and spaced relation for engagement by the respective plate loader 25P, 25N of the element assembly apparatus. It will be understood that while a separate plate supply apparatus 11P, 11N is provided for the positive and negative plates they are substantially identical in construction and operation and only one need be described in detail.

In illustrated plate supply apparatus 11P, the shuttle feed device 40P, as shown in more detail in FIGS. 3-6, has three plate supply chambers 45 for holding stacks of plates 30P which are commonly oriented and are in predetermined transversely spaced relation to each other. The shuttle feed device 40P includes a base plate 46 mounted in vertically spaced relation above the upstream or supply reel end of stationary support channels 48 of the walking beam transfer device 41P, which in turn is mounted to a frame 49 of the apparatus as will be described later. The supply chambers 45 of the shuttle feed device 40P each are defined by a respective outside panel 50 mounted on an outside mounting plate 51 that is fixed to the base plate 46, an inside panel 52 which in turn is mounted on an inside mounting plate 54 fixed to the base plate 46, a rear panel 55 bolted at one side to the outside mounting plate 51 and extending across the rear of the chamber, and a forward panel 56 supported between the outside and inside mounting plates 51, 54. The outside and inside panels 50, 52 in this instance each are formed with a flange 50a, 52a extending into the respective chamber 45 for locating a stack of plates 30P appropriately within the chamber and for defining slots 45a, 45b adjacent opposite sides of the chambers for receiving lugs 30a of the electrode plates, depending upon the orientation of the electrode plates in the chambers 45. In the illustrated embodiment, the electrode plates 30P are disposed with their lugs 30a in the slot 45a defined by the flange 50a of the outside panel 50. Each inside panel 52 in this case is formed with an elongated mounting slot 52b to permit adjustable positioning of the panel 52 for the particular size electrode plates to be dispensed.

To facilitate loading of electrode plates into the supply chambers 45 of the shuttle feed device 40P, each inside panel 52 preferably is of a reduced height, being about one-half the depth of the chamber in the illustrated embodiment (FIG. 4), so as to enable an operator standing adjacent that side of the shuttle feed device 40P to more easily position stacks of plates into the supply chambers. Typically, as the electrode plates 30P are fed from the shuttle feed device, as will become apparent, and the height of the stacks of electrode plates reduced to about the top level of the inside panels 52 the operator would refill the supply chambers. For guiding the electrode plates 30P into the lower portions of the supply chambers 45, each inside panel 52 is formed with a beveled corner 52c (FIGS. 3 and 4). It will be appreciated that the shuttle feed device 40N for the plates of opposite polarity can similarly be designed for loading from an inside location such that both shuttle feed devices 40P, 40N may be supplied with electrode plates by an operator located at a single station therebetween.

For simultaneously dispensing a single electrode plate from each supply chamber 45 and positioning such plates in similarly oriented relation on the stationary support channels 48 of the walking beam transfer device 41P, the base plate 46 is formed with respective electrode plate discharge openings 60 (FIG. 5) immediately adjacent each supply chamber 45 and a stripper plate 61 is mounted for relative sliding movement on the base plate 46 for successively engaging the lower most electrode plate in each supply chamber 45 and moving it through a respective exit slot 62 at the bottom of the chamber 45 into position to fall through the adjacent discharge opening 60. The stripper plate 61 in this case is retained in guideways 64 at its opposite sides for movement in forward and rearward directions transverse to the forward and rear panels 56, 55. The inside, outside, and rear chamber panels 52, 50, 53 each are mounted with their lower ends in closely spaced position above the stripper plate 61 to permit such stripper plate movement. The front panel 56 of each supply chamber 45 is formed with a lower opening 56a within which is mounted a gate 66 that is selectively positioned with respect to the base plate 46 to define the exit slot 62.

For selectively moving the stripper plate 61 from a retracted plate receiving position and a forward plate discharge position, an air cylinder 68 is mounted at a forward end of the base plate 46 (FIGS. 3 and 5) and has a piston rod 68a coupled to the stripper plate 61 through a mounting block 69. For guiding movement of the stripper plate 61 relative to the base plate 46, guide blocks 70 are mounted on the underside of the stripper plate 61 at its opposite ends and ride in a guideway 71 formed in the base plate 46.

Figures 5, 6:
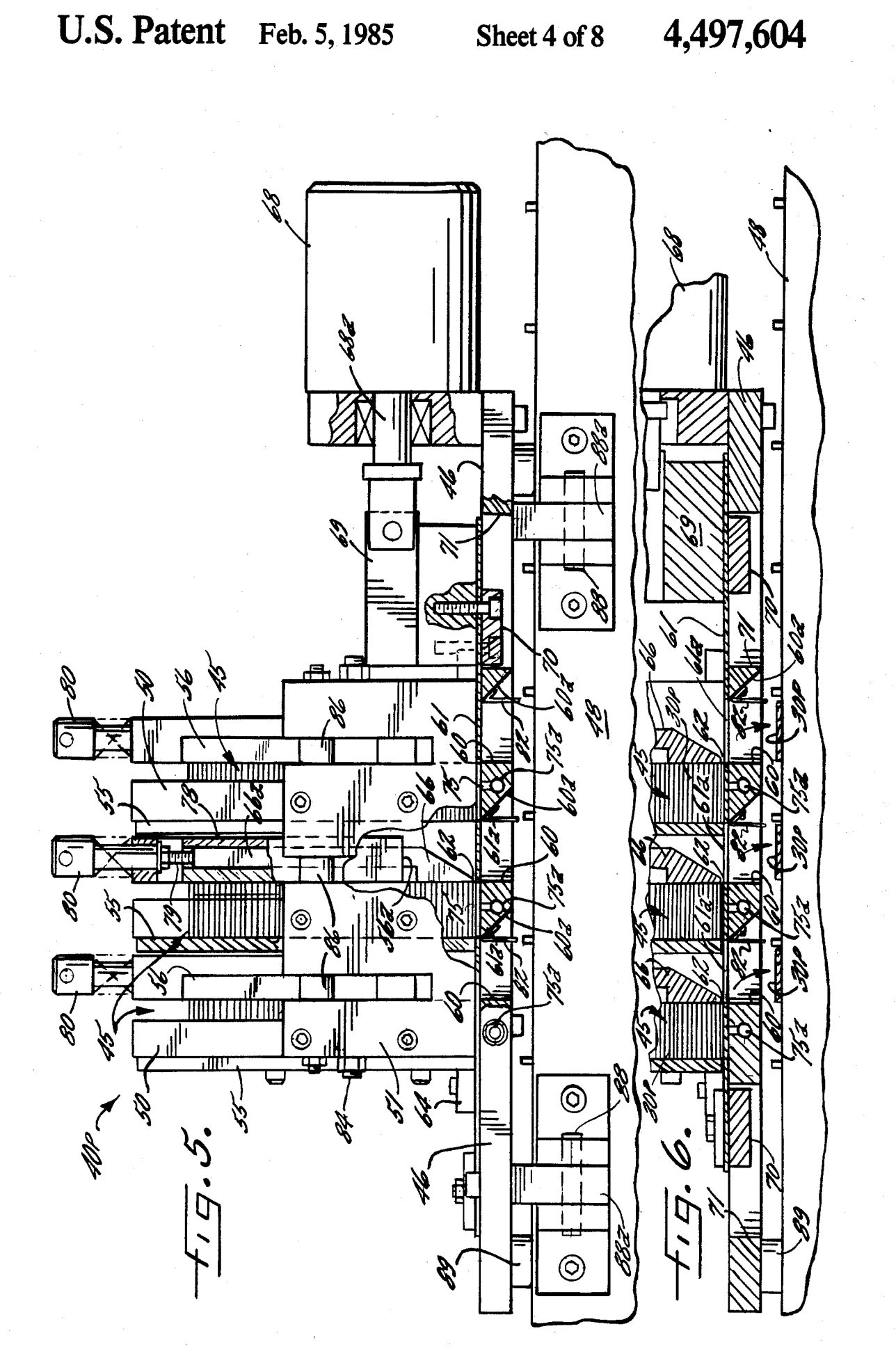

The stripper plate 61 preferably is of a gage substantially equal to the thickness of the individual electrode plates 30P to be fed and is formed with three rectangular plate receiving openings 61a such that when the stripper plate 61 is in a retracted position, or to the left as viewed in FIG. 5, the stacks of electrode plates 30P each are disposed within a respective one of the stripper plate openings 61a directly on the base plate 46 and when the stripper plate 61 is moved to its plate dispensing position, or to the right as viewed in FIG. 6, the stripper plate 61 will engage the lower most electrode plate 30P of each stack and force the plates through the respective exit slot 62, with the stripper plate sliding under the remaining plates of each stack. In order to permit relatively precise control of such electrode plate dispensing, the base plate 46 is formed with a vacuum pad 75 in each supply chamber 45 for retaining the lower most plate of each stack firmly against the base plate 46 and each discharge gate 66 is adapted for precise vertical adjustment in establishing the exit slots 62. The vacuum pads 75 in this instance each comprise a plurality of vertical apertures in the base plate 46 coupled to a common horizontal aperture 75a, which in turn may be connected to a vacuum manifold so as to communicate vacuum pressure to the pads 75 (FIG. 4). Each of the gates 66 in the illustrated embodiment is mounted for vertical movement in a guide 78 secured to a respective forward panel 56 and has an upper end 66a in threaded engagement with a shaft 79 carried by a rotatable head 80 (FIG. 5). Rotation of the head 80 will thereby permit selected vertical raising or lowering of the gate 66 for establishing the precise exit slot opening 62. Preferably, the gate 66 should be set such that the exit slot 62 is about one and one-half times the thickness of the electrode plates 30P to be fed, which has been found to permit the free discharge of the lower most electrode plate of each stack while retaining the remaining plates of the stack in the supply chamber.

By virtue of the side thrust exerted on the electrode plates 30P by the stripper plate 61 during such dispensing, the underside of each discharge opening across from the side the electrode plates enter preferably is formed with a bevel 60a so as to avoid direct engagement by the electrode plates (FIG. 5). Preferably a flexible damping sheet 82 also is secured to each rear panel 55 with a lower portion extending into the discharge opening 60 to dampen the lateral movement of the electrode plates.

For the purpose of enabling an operator to quickly correct any jam or malfunction that might occur during operation of the shuttle feed device 40P, each forward panel 56 is mounted for pivotal movement about a hinge pin 84 carried by the outside mounting plate 51 (FIG. 4). By raising a lock lever 85 secured to an opposite side of each forward panel from a locked position, shown in solid lines in FIG. 4, to a raised unlocked position shown in phantom lines, each forward panel 56, together with the gate 66 mounted thereon, may be pivoted to a raised position against a stop 86 so as to enable access to any electrode plate that might be jammed at the bottom of the supply chamber 45. For enabling the operator to further check electrode plates on the support channels 48 below the base plate 46, the entire shuttle feed device 40P is mounted for pivotal movement, as shown by broken lines in FIG. 4, about a hinge pin 88 mounted in a block 88a on one side of the support channels 48. A spacer 89 is mounted at the opposite side of the support channels 48 for supporting the base plate 46 of the shuttle feed device 40P in predetermined spaced relation with the support channels 48 of the walking beam transfer device 41P upon repositioning of the shuttle feed device to its operating position.

In keeping with the invention, each walking beam transfer device 41P is adapted to successively receive groups of electrode plates from the shuttle feed device 40P and advance a plurality of electrode plates into rows comprising a relatively large number of such plates for pick-up and utilization by the element assembly apparatus. The stationary support channels 48 of the walking beam transfer device 41P in the illustrated embodiment extend from a position below the shuttle feed device 40P to a position beyond the pre-fold mechanism 31 of the element assembly apparatus 10 (FIGS. 1 and 2). The support channels 48 in this instance are supported at longitudinally spaced intervals by flexible rubber mounts 90 that are fixed to respective cantilever brackets 91, which in turn are bolted to the apparatus frame 49 (FIG. 4). The support channels 48 are mounted so as to define an elongated upper opening of a width less than the length of the electrode plates to be transferred such that electrode plates dispensed onto the support channels by the shuttle feed device 40P can be suspended between the channels 48.

For successively moving electrode plates 30P deposited upon the support channels 48 in a direction toward the plate loader 25P, a walking beam 95 is mounted below the elongated opening of the support channels 48 for reciprocating vertical and translational movement. The walking beam 95 in this case comprises a generally U-shaped channel having a pair of spaced apart upstanding legs 95a and extends substantially the same length as the stationary support channels 48. The upper ends of the channel legs 95a have upstanding electrode plate engaging pins 96 mounted therein at intervals corresponding approximately to twice the width of the electrode plates to be transferred.

Figure 9:
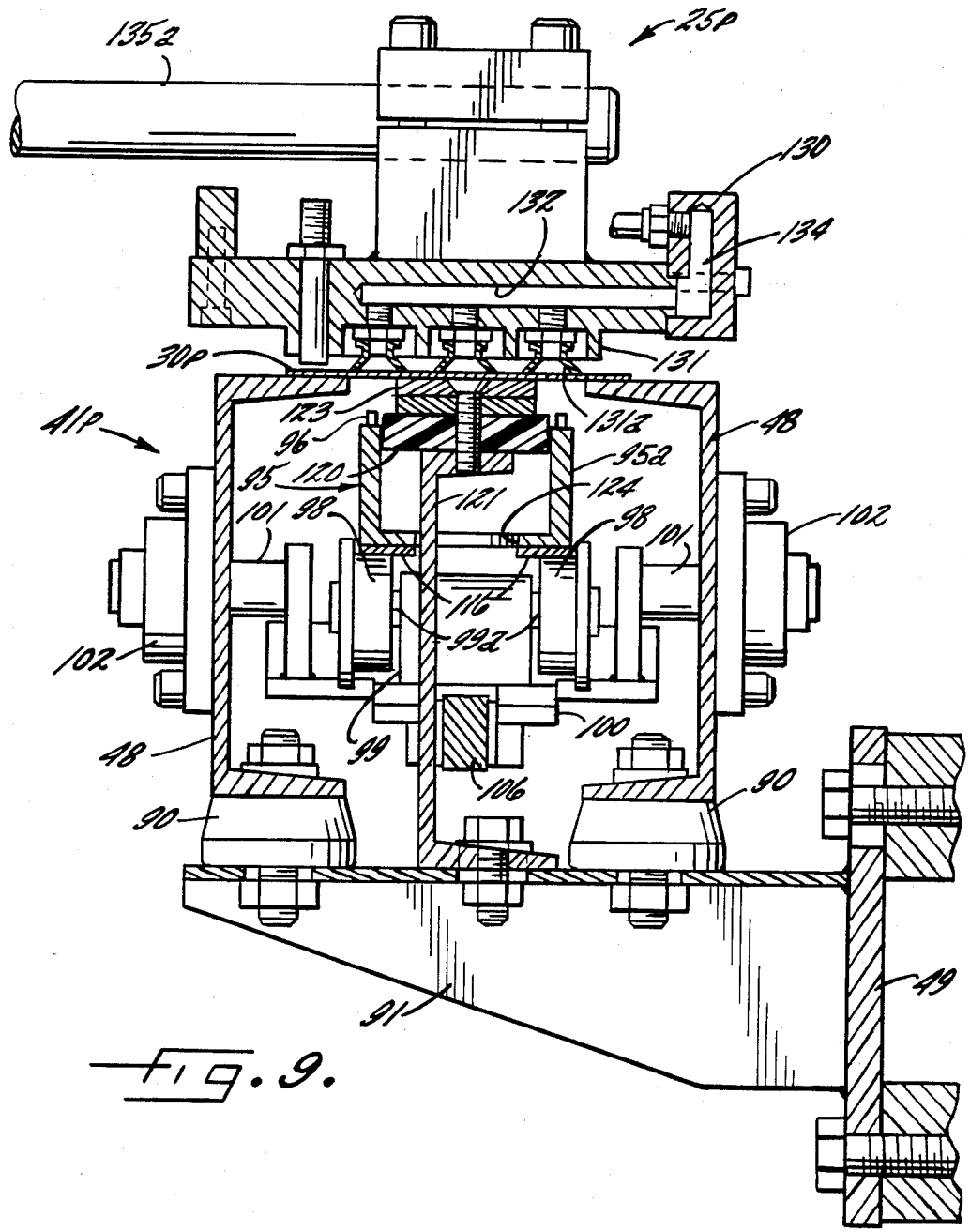
FIG. 9 is an enlarged vertical section of the plate loader engaging plates on the walking beam transfer device, taken in the plane of line 9—9 in FIG. 2.

For supporting the walking beam 95 for longitudinal and vertical movement relative to the support channels 48, the walking beam 95 is carried by pairs of rollers 98, which each have an eccentric pivot mounting with respect to the channel supports 48. As best shown in FIGS. 4 and 7, each pair of walking beam support rollers 98 is rotatably mounted in a central hub 99 that is fixed to a pivot bracket 100 having outwardly extending support shafts 101 pivotably mounted in respective bearing blocks 102 carried by the support channels 48. The axis 99a of the rollers 98 are offset from the pivot axis of the bracket shafts 101 such that pivotable movement of the bracket 101 from the position shown in FIGS. 7a and 7b to a 90° pivoted position shown in FIGS. 7c and 7d will lower the elevation of the rollers 98 and the walking beam 95 supported thereon from a raised position in which the walking beam pins 96 are disposed above the top surface of the channel supports 48 to a lowered position in which the rollers 98 support the walking beam 95 with the pins 96 thereof below the upper surface of the support channels 48 (FIG. 9). The rollers 98 preferably each have an enlarged outer flange 98a for insuring proper seating of the walking beam 48 on the rollers.

To permit selected simultaneous pivoting of the pivot brackets 100 for each pair of walking beam support rollers 98 between the aforesaid opposed 90° positions, each of the brackets 100 has a pair of depending ears 105 coupled to a common tie rod 106. The downstream end of the tie rod 106 is connected by a bracket 108 to the end of a piston rod 109a of a double actuating air cylinder 109 that is connected to the apparatus frame 49 by a bracket 110. As illustrated in FIGS. 7a–7d, actuation of the cylinder 109 extending rod 109a will simultaneously pivot the brackets 100 from the raised roller and walking beam position to the lowered position and reverse actuation of the cylinder 109 retracting the piston rod 109a will return the rollers 98 and walking beam 95 to their raised position. The cylinder 109 and rod 109a are supported at their opposite ends for pivotable movement to accommodate the limited raising and lowering of the tie rod that occurs during pivoting of the brackets 110.

For selectively moving the walking beam 95 in longitudinal forward or reverse directions relative to the support channels 48 when in either a raised or lowered position, a double actuating air cylinder 115 is supported at one end by the support channels 48 and has a piston rod 115a connected to the walking beam 95. Selected actuation of the air cylinder 115 can thereby move the walking beam 95 in either longitudinal direction relative to the support channels with the walking beam being supported for such movement by the rollers 98. Wear plates 116 in this instance are mounted on the underside of the walking beam 95 to minimize roller wear.

To guide longitudinal movement of the walking beam 95 and to provide central support for electrode plates positioned on the support channels 48, a plurality of guide plates 120 are mounted between the legs 98a of the walking beam at longitudinally spaced intervals along the length thereof, and a continuous support strip 123 extending the length of the support channels 48 is mounted upon the guide plates 120. The guide plates 120 in this instance are supported by upstanding brackets 121 (FIG. 9) carried by cantilever brackets 122 fixed to the frame 49, with the upstanding brackets 120 extending through appropriate elongated openings 124 in the walking beam so as to permit relative longitudinal and vertical movement of the walking beam (FIG. 9). The guide plates 120 preferably have a width that is slightly less than the spacing between the upstanding legs 95a of the walking beam 95. The continuous strip support 123 is carried by the plates 120 such that the upper surface thereof is substantially level with the upper surface of the support channels 48. The strip 123 preferably has perforated holes 123a (FIG. 4) and the lower confines of the support channels 48 is sufficiently enclosed such that the support channels 48 define a vacuum plenum, which when coupled to a suitable vacuum source, will draw out lead oxide dust and other particles that may be dropped from the electrode plates upon dispensing onto, or movement along, the walking beam transfer device. The vacuum plenum preferably is coupled to a central filter system for removing the contaminants from the air prior to recirculation in the atmosphere.

In carrying out the invention, the operations of the shuttle feed device 40P and walking beam transfer device 41P are coordinated so as to provide a continuous transfer of appropriately oriented and uniformly spaced electrode plates to the element assembly apparatus 10.

Figure 7A:
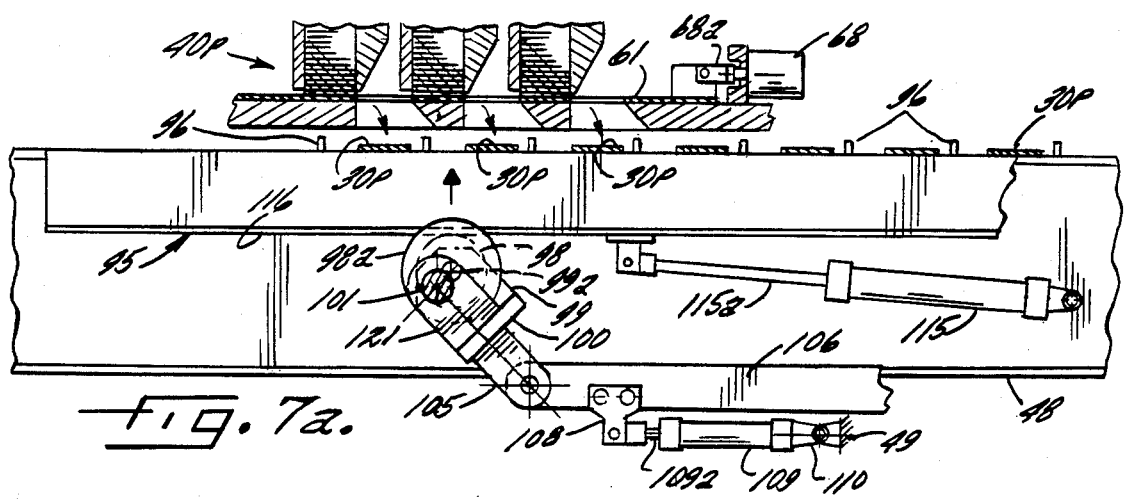
FIGS. 7a–7d is a partially diagrammatic sequential illustration of the operation of the shuttle feed and the walking beam transfer devices.
Figure 7B:
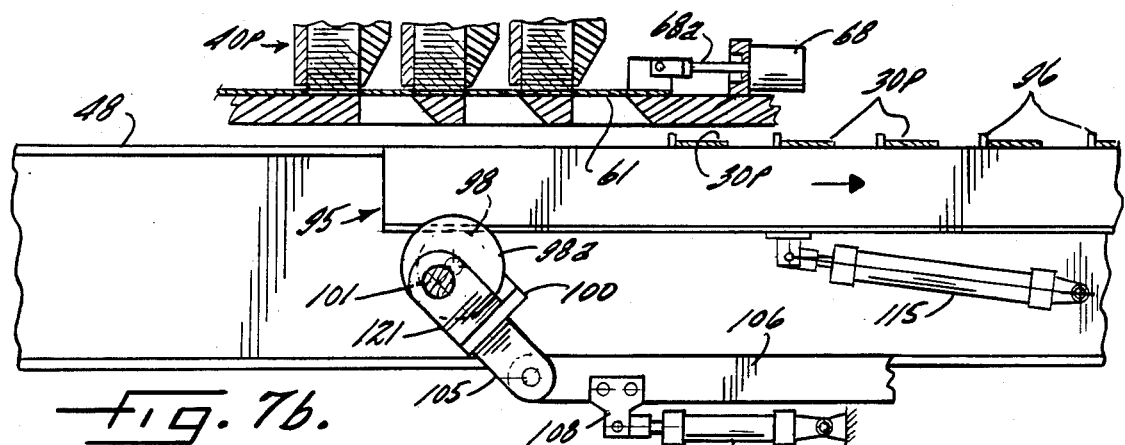
Figure 7C:
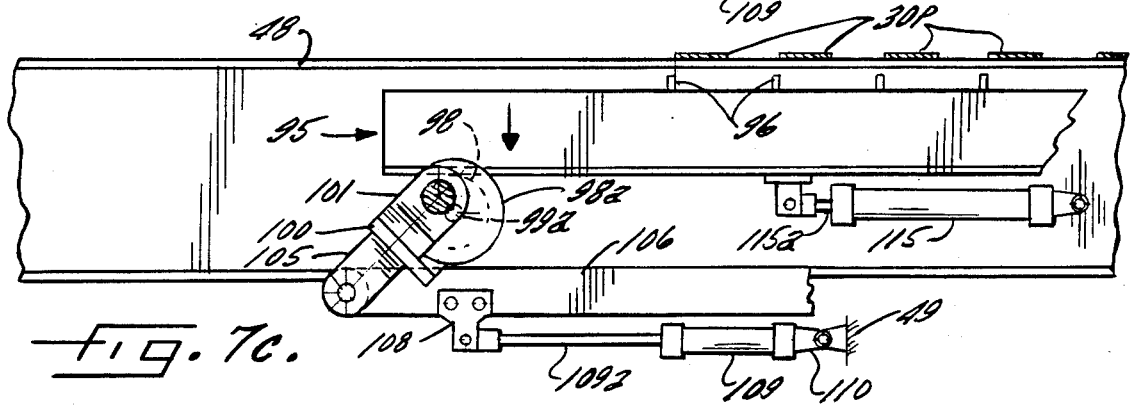
Figure 7D:
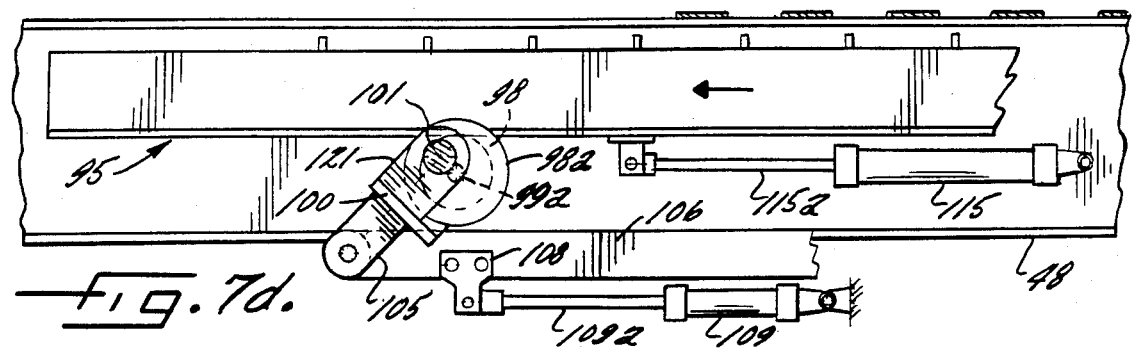

With the cylinder 115 actuated and the rod 115a thereof extended to position the walking beam at its rearward most position and with the cylinder 109 reverse actuated to retract its rod to position the rollers 98 and walking beam 95 in their raised positions, the walking beam 95 will be located with the pins 96 thereof extending above the upper periphery of the support channels 48 with the first three plate receiving sections of the walking beam, as defined in the longitudinally spaced pins 96, located under the shuttle feed device 40P, as shown in FIG. 7a. Actuation of the cylinder 68 retracting the piston rod 68a will move the striker plate 61 of the shuttle feed device 40P from the electrode plate receiving position to the plate dispensing position causing lowermost electrode plates 30P from the three supply chambers 45 to be simultaneously deposited onto the support channels 48 of the walking beam transfer device immediately in front of the first three sets of pins 96 of the walking beam (FIG. 7a). Reverse actuation of the cylinder 115 will thereupon move the walking beam 95 in a forward longitudinal direction with the first three sets of pins engaging the three electrode plates 30P dispensed onto the support channels 48 drawing them forwardly of the shuttle feed device while maintaining their spaced and commonly oriented relationship (FIG. 7b). It will be understood that forward movement of the walking beam 95 can be selectively established by appropriate adjustment of the stroke of the cylinder 115. Following such forward walking beam movement, the cylinder 109 is actuated to move the rollers 98 and the walking beam 95 to their lowered positions with the pins 95a below the upper periphery of the support channels 48 (FIG. 7c). The cylinders 115, 109 may then be successively operated to return the walking beam to its rearmost position (FIG. 7d) and then its raised position (FIG. 7a) for receiving the next set of three electrode plates from the shuttle feed device 40P. It will be appreciated that successive cycles of operation of the walking beam transfer device 41P will advance plates along the walking beam support channels 48 until such time as the entire length of the support channels carry a continuous row of uniformly spaced and commonly oriented electrode plates, as illustrated in FIG. 2.

Figure 8:
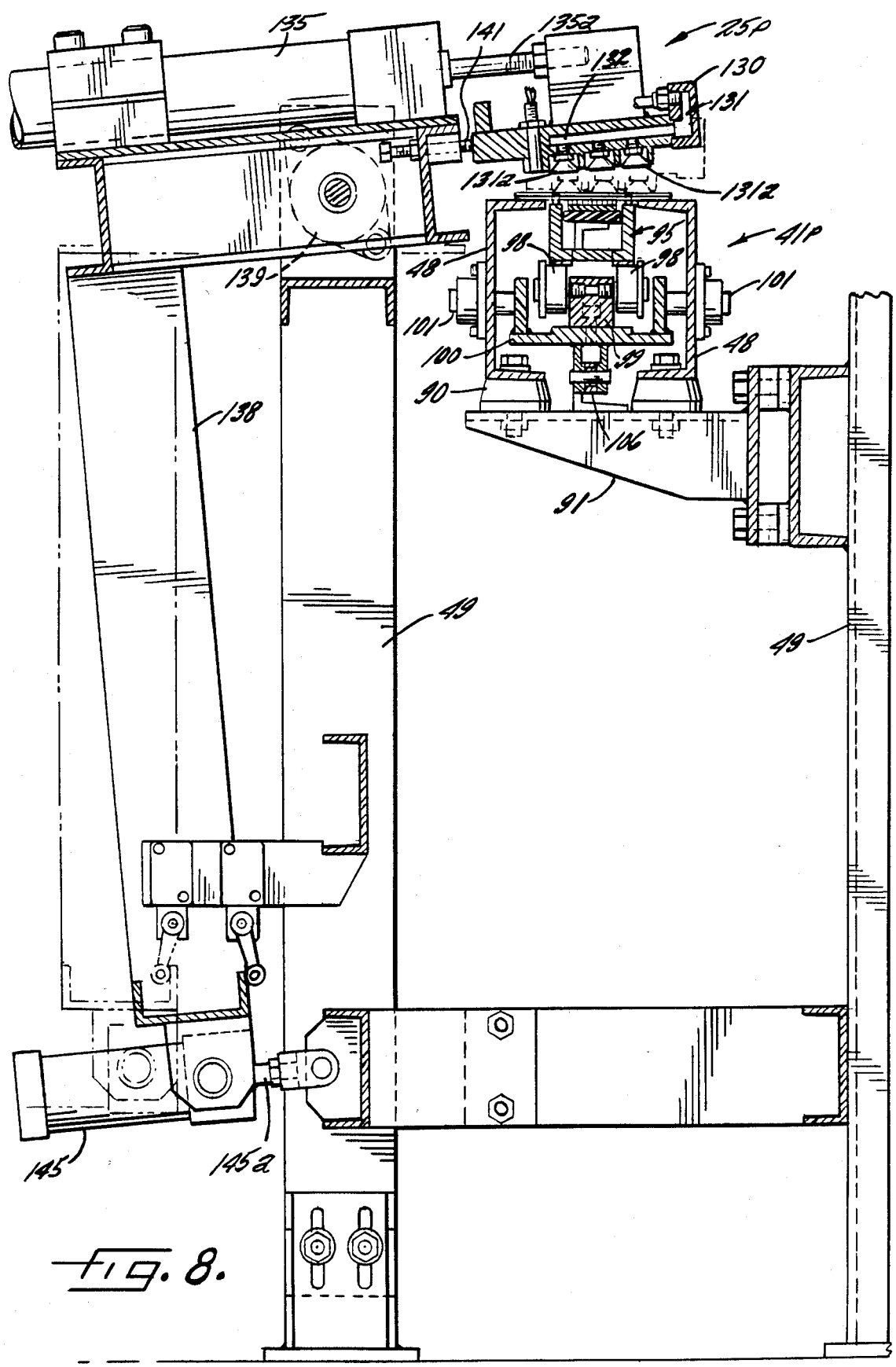
FIG. 8 is an enlarged vertical section of the plate loader and walking beam transfer device taken in the plane of line 8—8 in FIG. 2.

In further carrying out the invention, the plate loaders 25P, 25N of the element assembly apparatus 10 are operated in timed sequence with the plate supply apparatus 11P, 11N for successively engaging and removing from the walking beam transfer devices 41P, 41N the required number of electrode plates of common polarity for assembly of a battery cell element. As shown in FIGS. 1, 8 and 9, the forward end of each walking beam transfer device 41P, 41N in this instance extends between the respective plate loader 25P, 25N and the pre-fold mechanism 31. For transferring electrode plates from the respective walking beam transfer device 41P, 41N onto the pre-fold mechanism 31, each plate loader 25P, 25N, which is of the type disclosed in the aforesaid Sabatino et al application Ser. No. 381,227, has a transfer head 130 that is movable from a retracted position over its respective walking beam transfer device (FIG. 8) to an extended position over the pre-fold mechansim 31 (FIG. 9). The plate loader head 130 has a plurality of vacuum pads 131, corresponding in number to the electrode plates of common polarity that are to be assembled in the cell element. Each vacuum pad 131 in the illustrated embodiment has three suction cups 131a coupled to a common port 132 which in turn is connected to a vacuum manifold 134 extending the entire length of the head 130, the latter being coupled to a suitable vacuum pressure source.

The plate transfer head 130 is carried at the end of a rod 135a of a double actuating air cylinder 135 mounted on an L-shaped pivot frame 138. The pivot frame 138 is pivotably supported on the apparatus frame 49 in bearings 139. The plate transfer head 138 may be moved between its retracted and extended positions by appropriate actuation of the air cylinder 135, with guide rods 140 (FIG. 2) extending rearwardly from opposite ends of the head 130 guiding such movement. To permit selective adjustment in the retracted position of the plate transfer head 130, an adjustable stop 141 is mounted on the pivot frame 138 for engaging the head 130 upon retraction.

For lowering the plate transfer head 130 to a plate receiving position while in its retracted position over the walking beam transfer device (shown in phantom in FIG. 8), or to a lowered plate depositing position when extended over the pre-fold mechanism 31 (FIG. 10), an air cylinder 145 is carried at the lower end of the L-shaped pivot frame 138 and has a rod 145a pivotably coupled to the apparatus frame 49. By selected actuation of the air cylinder 145 the cylinder rod 145a can be extended or retracted to pivot the L-frame 138 and thereby raise and lower the plate transfer head 130 supported thereon. It will be understood that the timed sequential operation of the plate loaders 25P, 25N, the electrode plate supply apparatus 11P, 11N, the pre-fold mechanism 31, and the other functions of the element assembly apparatus 10 may be controlled by a Master Controller of the type disclosed in the aforesaid Sabatino et al application Ser. No. 381,227.

In practice, for example, when battery cell elements having 66 electrode plates are being assembled by the foregoing apparatus, each plate loader 25P, 25N would have 33 suction heads for engaging 33 plates of common polarity from the respective walking beam transfer devices 41P, 41N. In such case, following initial start-up of the plate supply apparatus 11P, 11N, for each operating cycle of the plate loader 25P, 25N the respective shuttle feed device 40P, 40N would be cycled eleven times (at three plates per cycle) to advance 33 plates to the plate loader. In practice it has been found that the operating cycle of the element assembly apparatus, and thus the plate loaders, permit such repetitive cycling of the electrode plate supply apparatus without impeding the production rate element assembly apparatus. It will be understood, of course, that the rate of operation of the shuttle feed devices, as well as the number of electrode plates dispensed per cycle, may be varied for the particular element assembly apparatus to which plates are to be supplied.

It will be further appreciated that the foregoing electrode plate supply apparatus and method can have significant operating advantages. First, while a relatively large number of electrode plates are simultaneously utilized in the assembly of each element, it is necessary for an operator to fill only a relatively few plate supply chambers of the shuttle feed devices. The operator can thereby focus his attention more carefully on maintaining an ample supply of electrode plates to the apparatus, reducing the chance of an inadvertent operator caused exhaustion of plate supply. Moreover, since the shuttle feed devices for both the positive and negative plates can be located in closely adjacent relation with the operator stationed between, the operator can readily service the plate supply chambers of both devices. The walking beam transfer device also enables the shuttle feed devices to be located at a convenient location even though the plate loading operation is carried on some distance therefrom. It is only during the initial start-up that the shuttle feed devices must fill the walking beam transfer devices prior to operation of the plate loaders. After initial start-up, the operation is continuous, regardless of the length of the walking beam transfer device. Finally, the shuttle feed devices are adapted to reliably dispense electrode plates onto the walking beam transfer device so as to insure pick up of the proper number of plates by the plate loaders, thereby reducing the chance of costly waste resulting from elements being formed with lesser or greater numbers of electrode plates than required. Furthermore, since the electrode plates are transferred on the walking beam following their dispensing by the shuttle feed device, a malfunction in such dispensing can be detected and often corrected before the plates reach the plate loader, so as not to interrupt the element assembly operation.

We claim:

1. In an apparatus for assembling battery cell elements having a plurality of electrode plates of alternating polarity comprising:
   plate feed means including means for containing at least one vertical stack of plates of common polarity and means for successively dispensing single plates from each said stack,
   transfer means for successively receiving plates from said dispensing means and moving the plates into a row with the plates uniformly spaced and commonly oriented,
   means for simultaneously removing from said transfer means the total number of plates of common polarity required for the assembly of a cell element,
   means cyclically operating said plate dispensing means and plate removing means, and
   said removing means being operable to remove during each cycle of operation a number of plates at least equal in number to those dispensed during each cycle of operation by said dispensing means.

2. The apparatus of claim 1 in which said feed means includes a plurality of plate supply chambers for containing stacks of plates of common polarity, said chambers containing said stacks of plates in predetermined spaced relation and in common orientation, and said dispensing means simultaneously dispenses a single plate from each chamber unto said transfer means.

3. The apparatus of claim 1 in which said feed means includes at least one plate supply chamber for containing a stack of plates to be dispensed, said chamber having an exit slot in a side thereof, means defining a discharge opening adjacent said chamber, and stripper means for successively engaging a lower most plate contained in said chamber and moving said plate through said exit slot and into said discharge opening.

4. The apparatus of claim 3 in which said transfer means includes elongated stationary support means for receiving plates dispensed through said discharge opening, and walking beam means mounted for cyclic longitudinal and vertical movement relative to said stationary support means for successively engaging plates supported on said support means and simultaneously moving said plates a predetermined distance along said support means during each cycle of movement while maintaining the spacial relationship and common orientation of said plates.

5. The apparatus of claim 4 in which said walking beam means includes upstanding plate engaging pins at longitudinally spaced intervals corresponding to the desired spacing of said plates, and means for cyclicly moving said walking beam means so that said pins are cyclicly raised above the level of said support means during a portion of each cycle to engage respective plates positioned thereon and move said plates along said support means.

6. The apparatus of claim 4 in which said stationary support means includes a pair of parallel supports transversely spaced a distance less than the length of the electrode plates to be transferred, said dispensing means being operable to dispense said plates onto said stationary support means such that they are suspended between said supports, and said walking beam means is mounted for cyclic longitudinal and vertical movement between said parallel supports.

7. The apparatus of claim 6 in which said walking beam means includes a channel having upstanding parallel legs with a transverse spacing less than the spacing between said stationary supports.

8. The apparatus of claim 7 including perforated means covering the top of said walking beam channel, and vaccuum means communicating with said channel for drawing air inwardly through said perforated means.

9. The apparatus of claim 7 in which said walking beam means includes first means for cyclically raising and lowering said channel from positions below and above said parallel supports, second means for cyclically moving said channel in longitudinal forward and rearward directions relative to said parallel supports, and means for synchronizing the operation of said first and second channel moving means.

10. The apparatus of claim 7 including flexible dampening means carried in the discharge opening for each chamber for dampening lateral movement of plates dispensed from the chamber.

11. The apparatus of claim 3 in which said stripper means is a flat plate mounted for movement between a retracted plate receiving position and advanced plate dispensing position.

12. The apparatus of claim 11 in which said stripper plate has a thickness substantially equal to thickness of an individual plate to be fed and is formed with a plurality of openings within which a plurality of stacks of plates are respectively disposed when the stripper plate is in said retracted position.

13. The apparatus of claim 11 including vacuum means in the bottom of each said supply chamber for holding the lowermost plate of each stack firmly in position for engagement by said stripper plate.

14. The apparatus of claim 3 in which each said plate supply chamber is defined by front, rear and side panels, and at least one of said panels for each chamber is selectively removable to permit access to the interior of the chamber.

15. The apparatus of claim 14 in which at least one side panel of each chamber includes lug alignment means extending into the chamber for facilitating proper positioning of plates in the chamber.

16. The apparatus of claim 3 in which said plate supply chambers each are defined by a base plate and a plurality of upstanding panels, said exit slot for each chamber being defined by a spacing between the underside of one of said panels and said base plate, vertically positionable gate means mounted on said one panel for permitting selective adjustment of the height of the exit slot, and said discharge opening for each chamber being formed in said base plate adjacent an outer side of said one panel.

17. The apparatus of claim 16 in which said transfer means includes stationary support means, said chamber base plate being mounted in vertically spaced relation above said stationary support means and for pivotable movement relative to said support means to permit access to the support means below.

18. A method of supplying electrode plates in the assembly of battery cell elements comprising forming at least one vertical stack of plates of common polarity, successively dispensing plates from said stack onto an elongated support means, moving said plates dispensed onto said support means into a row with the plates uniformly spaced and commonly oriented, and simultaneously removing from said support means the total number of plates of common polarity required for the assembly of a cell element while maintaining their uniform spacing and common orientation.

19. The method of claim 18 including forming a plurality of stacks of plates of common polarity, cyclically dispensing a single plate from each stack onto said support means, and simultaneously removing a number of plates at least equal in number to those dispensed during a dispensing cycle.

20. The method of claim 19 including dispensing the lowermost plate of each stack onto said support means.

21. The method of claim 19 including forming a plurality of plate stacks which are lesser in number than the number of plates required for assembly of a cell element.

22. The method of claim 18 including moving said plates by cyclically moving a walking beam vertically and longitudinally with respect to said support means.

23. In an apparatus for assembling battery cell elements including a separator sheet supply station, an element folding station, a positive electrode plate supply apparatus on one side of said sheet supply and element folding stations, and a negative electrode plate supply apparatus on the other side of said sheet supply and element folding stations, each said plate supply apparatus including
plate feed means including means for containing at least one vertical stack of plates of common polarity and means for successively dispensing plates from said stack,
transfer means for successively receiving plates from said dispensing means and moving the plates into a row with the plates uniformly spaced and commonly oriented, and
means for simultaneously removing from said transfer means the number of plates of common polarity required for the assembly of a cell element and positioning said plates at said folding station while maintaining their uniform spacing and common orientation.

24. The apparatus of claim 23 in which said plate feed means for each said plate supply apparatus includes a plurality of plate supply chambers for containing stacks of plates of common polarity, said chambers for said positive plate supply apparatus being laterally spaced apart from said chambers for said negative plate supply apparatus so as to define a central plate supply apparatus loading station therebetween.

25. The apparatus of claim 24 in which said central loading station is adjacent an upstream end of said sheet supply station.

26. The apparatus of claim 23 in which said transfer means for each said plate supply apparatus includes elongated stationary support means receiving plates dispensed by said plate feeding means, said stationary support means extending from a position adjacent said plate feeding means to a position adjacent said folding station, and walking beam means mounted for cyclic longitudinal and vertical movement relative to said stationary support means for successively engaging plates supported on said support means and simultaneously moving said plates a predetermined distance along said support means during each cycle of movement while maintaining the spacial relationship and common orientation of said plates.

27. In an apparatus for assembling battery cell elements having a plurality of electrode plates of alternating polarity comprising:

plate feed means including a plurality of plate supply chambers for containing stacks of plates of common polarity, said chambers containing said stacks of plates in predetermined spaced relation and in common orientation, said plate feeding means further including dispensing means for simultaneously dispensing successive single plates from each said chamber, transfer means for successively receiving plates from said dispensing means and moving the plates into a row with the plates uniformly spaced and commonly oriented, means for simultaneously removing from said transfer means the number of plates of common polarity required for the assembly of a cell element, means cyclically operating said plate dispensing means and plate removing means, and said removing means being operable to remove a greater number of plates during each cycle of operation than are dispensed during each cycle of operation by said dispensing means.

* * * * *